United States Patent Office 3,032,713
Patented May 1, 1962

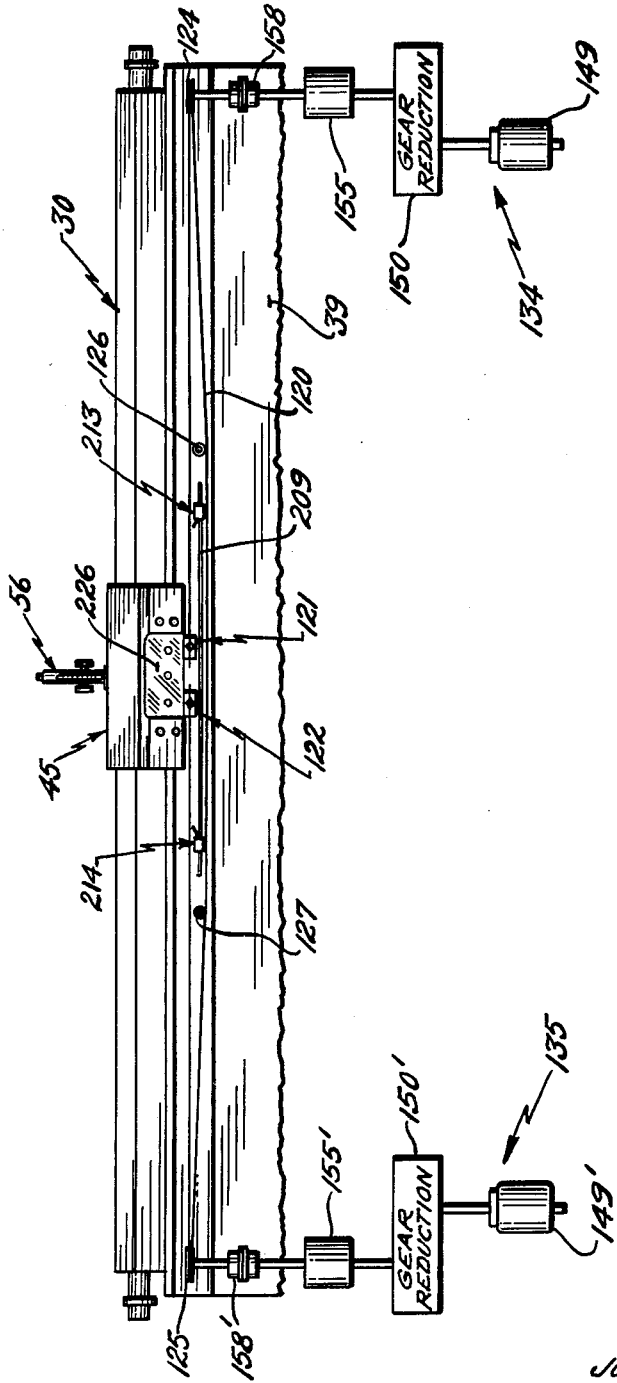

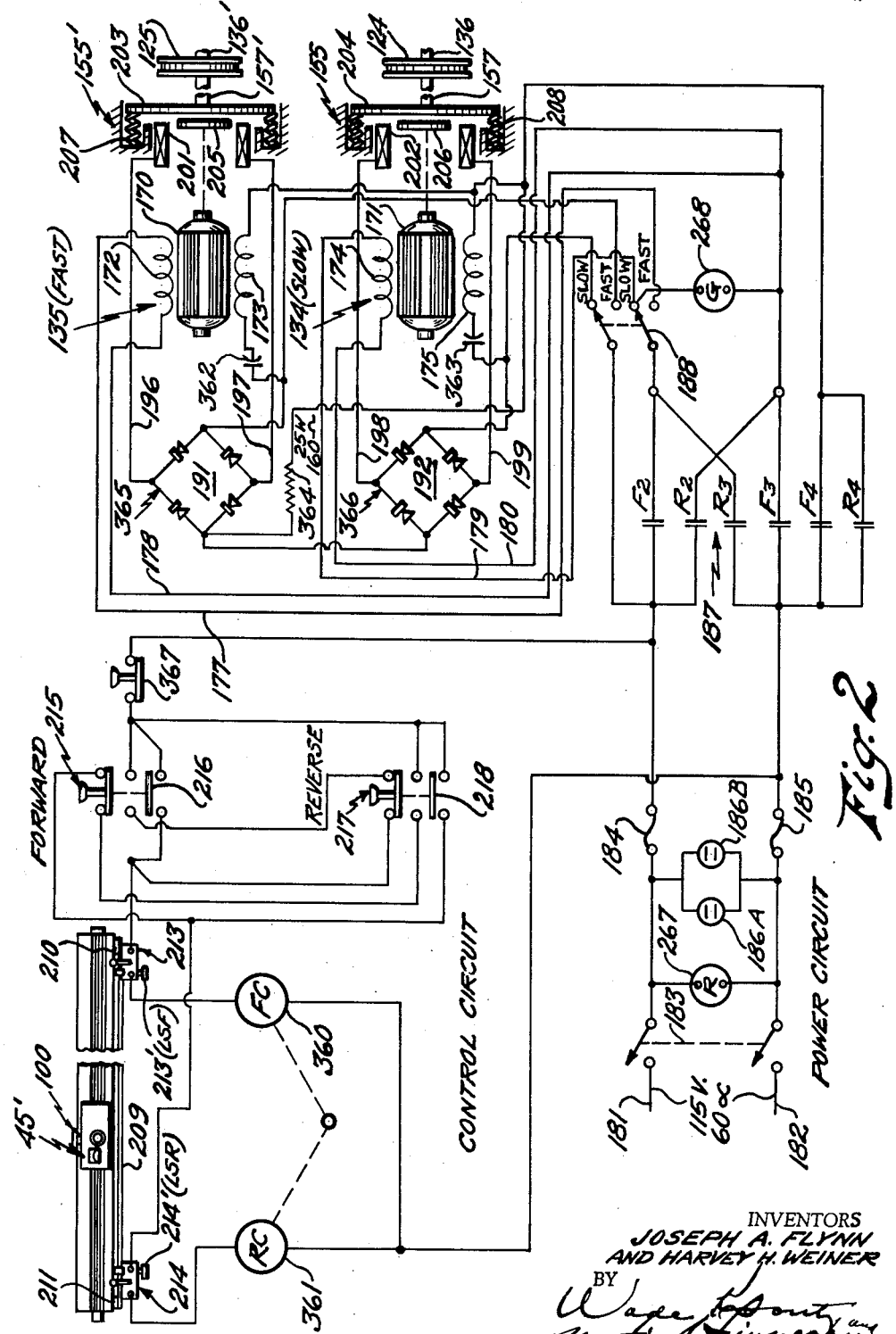

3,032,713
ELECTRICAL MEASURING SYSTEM
Joseph A. Flynn, Boston, Mass. (29 N. Bowditch St., Braintree 84, Mass.), and Harvey H. Weiner, Boston, Mass. (122 W. Selden St., Mattapan 26, Mass.)
Filed July 11, 1958, Ser. No. 748,097
4 Claims. (Cl. 324—58)
(Granted under Title 35, U.S. Code (1952), sec. 266)

The invention described herein may be manufactured and used by or for the United States Government for governmental purposes without payment to us of any royalty thereon.

This invention relates to electrical measuring systems, and particularly to the measurement of impedance or related characteristics of radio-frequency energy in the shorter-wave-length categories.

An object of the invention is to provide power-driven electrical and mechanical means, inter-related in novel fashion, to actuate and control the traverse of a measuring instrument along a wave guide or equivalent impedance measuring line.

More specifically, other objects are to provide means for producing reciprocal travel of a probe-carrying assembly along a wave guide for impedance measuring purposes; and to provide electro-mechanical controls of the speed, stroke, and reversal of such carriage assembly.

These and other objects of the invention will be better understood upon examination of the following description of the embodiment illustrated in the accompanying drawings wherein:

FIG. 1 is an elevation view of the mechanism for measuring impedance at successive points along a coaxial line; and FIG. 2 is a schematic wiring diagram showing drive control circuitry embodying the invention, and applicable to drive the mechanism indicated in FIG. 1.

Referring first to FIG. 1, the coaxial assembly 30 consists of a longitudinally divided outer conductor, a centrally disposed inner conductor, and a dielectric material therebetween, as disclosed and claimed in companion patent application No. 748,100, filed on even date herewith by Joseph A. Flynn, one of the co-applicants herein, and now pending in the U.S. Patent Office; the said assembly 30 being slidably supported on a channel-shaped bed or base structure 39, which structure in turn may rest upon an I-beam running the length of and resting upon a rigid table or other supporting structure (as shown in said application) serving to position the assembly at a convenient height for operation and observation of the machine's performance.

The assembly also includes a carriage structure 45 riding on a set of rails or ways, as shown in detail in said companion patent application, which elements serve as guiding tracks facilitating longitudinal traverse of the carriage 45 under the propelling force of either one of two motor-driven assemblies 135, 134 whose "fast" and "slow" motors 149', 149 are selectively energizable by the operation of double-pole, two-position switch 188 forming part of the control circuitry shown schematically in FIG. 2.

As shown in FIG. 2, the motor armatures 170 and 171 are provided with field windings 172 to 175, inclusive, in shunt relationship therewith and energized by way of the four conductors indicated at 177 to 180, inclusive, which conductors are in turn supplied with 60-cycle alternating current from main supply lines 181 and 182 by way of main switch 183, protective fuses 184 and 185, reversing switch 187, speed selector switch 188, and rectifier networks 191 and 192 for converting the alternating current of the supply lines to direct current for delivery to the respective armature and field windings. The circuitry just described is supplemented by the provision of parallel branches including the conductors 196 to 199, inclusive, leading to and from the windings of a pair of solenoids 201 and 202, having plate-like armatures 203 and 204 normally held spaced away from co-operating (motor-driven) clutch plates 205 and 206, respectively, by the separating pressure applied thereto, by way of coiled compression springs 207 and 208, respectively. Upon reception of energizing current selectively applied to the solenoid 201 or 202, as the case may be (depending upon whether switch 188 is in the upper position indicated in FIG. 2 or in the opposite lower position) the magnetized clutch plate 203 (or 204) moves into engagement with the complementary clutch plate 205 (or 206), and thereby transmits the rotation of the concurrently energized armature 170 (or 171) to shaft 157' (or 157), coupling 158' (or 158), (FIG. 1), and thence to the carriage tape driving pulley 125, or 124, the said pulleys having hub extensions or shafts 136' and 136 rotatable with the clutch plates 203 and 204, respectively, to complete the path of torque transmission from the respective armatures to the pulleys when said clutch engagement is established.

When the linear travel of the carriage assembly 45, under the driving actuation of the pulley just described, has proceeded to the full predetermined distance desired for the accomplishment of the electrical measurements required, the motion of the carriage assembly will be terminated in the two respective directions by operation of the adjustable motor de-energizing switch assemblies 214 or 213 (FIG. 2) (as the case may be) or in the alternative by actuation of one of the manually-controlled switches indicated at 215 to 218, inclusive. In either case the opening of any one of the switches 213, 214, 215, 216, 217 or 218, will interrupt the flow of current to whichever motor armature (170 or 171) has been receiving energization, since all of the switches just enumerated are located in the portion of the energizing circuit intervening between the main supply terminals 181 and 182, on the one hand, and the selector switch 188 on the other. It follows that interruption of current flow to the driving motor will be accompanied by interruption of current flow to the associated solenoid 201 (or 202, as the case may be) since the solenoid circuits are parallel branches of the respective motor energizing circuits. Electrical transmission to instruments is provided by means of outlets 186A and 186B. Warning lights 267 (red) and 268 (green) is further described hereinafter.

Expounding on the purpose of said invention the machine is used for the traversing of a carriage 45, carrying electric probe 56 over a long path of a coaxial line 30 (10 feet long, approximately) in both forward and reverse directions at a fast speed in conjunction with or without manual operation; or at a slow speed with or without manual operation for automatic recording. As noted in the above described co-pending application the use of a recording instrument provides graphic records of test performed by this highly precisioned impedance measuring line.

A complete cycle of operation may embrace all of the following elements: First, the entrance components, including a two-pole single throw disconnect switch 183 connected to 110 volt 60 cycle alternating current lines 181, 182; a red light 267 wired to show that the circuit is "on"; and fuses (184, 185) being used for the protection of the electrical components against damage through overloading the circuits.

Secondly, the branching off from the fuses, into a "power circuit" and a "control circuit" respectively, is as follows:

The power circuit contains a single phase four wire reversing switch (187) for starting and reversing the rotation of the motors (fast 135, slow 134). The circuit also includes holding coils and electrical interlocks 360, 216, 361 and 218 (further described hereinafter). The circuit further includes a double pole-double throw selector switch 188 for selecting either motor for operation; a green light 268 to show when the slow motor is operating; two gear reducer type synchronous motors 135 and 134 with speeds of 10 r.p.m. and 2 r.p.m. and starting capacitors 362 and 363, respectively, for driving the carriage at a fast or slow rate; a 160-ohm, 25-watt resistor 364 to reduce the line voltage; two selenium type full wave rectifiers 365 and 366, respectively, to supply direct current to the clutches; the single disc magnetic clutches 155' and 155 attached to motors 135 and 134; and two drive shafts 157', 157 at each end of the machine, connecting to the carriage by way of the tape previously described.

The control circuit contains the holding coils 360 and 361 and interlocks 216 and 218 of the reversing switch 187; a "forward start" push button 215; a reverse start push button 217; a stop button 367 and two stroke controlling limit switches 214 and 213; shiftable toward or away from either end of the machine to regulate the travel of the carriage.

The method of operation is as follows:

(1) For fast speed probe travel selector switch 188 is turned "fast" position on switch, and for forward movement from "0" to "3000" on scale the following method is used:

a. Forward (left to right) movement of carriage:
(1) With switch 183 closed, lamp 267 will show the circuit as "on"; when "forward" button 215 is pressed, current will flow from 182 through forward holding coil 360, forward limit switch 213; across the upper closed contacts of the reverse button 217, through depressed or lower contacts of 215, thence through stop button 367 to 181.
(2) When coil 360 is energized contacts F2, F3, and F4 of switch 187, also 216, are automatically closed and held in said position by the energized coil 360. Motor 135 will rotate in a clockwise direction, at the same time rectifier 365 will operate and supply direct current to clutch 155'. The energizing of the clutch grips the armature 203 thereof which is attached to a drive shaft 157' of the machine moving the carriage by means of a belt drive in a forward or left to right direction. When the carriage contacts limit switch 214, same will open and the carriage will stop, contacts F2, F3, F4 and 216 will open and the circuit de-energized.

b. Reverse movements of carriage is accomplished by pressing reverse button 217. The reverse circuit will be energized even though the forward limit switch 213 is open. With the reverse coil 361 operating reversing switch contacts $R_2$, $R_3$, $R_4$ and 218 will close and the motor 135 rotation will be reversed, likewise the carriage will operate from "3000" to "0" scale reading. If left to continue, limit switch 213 will open on contact with the carriage and circuit will be opened and the carriage will stop.

c. To stop the carriage at any position on the scale, by pressing the stop button 367 the circuit will be de-energized.

2. For slow or automatic recording speed, the selector switch 188 is turned to "slow" and the operation first described herein, is used for either forward or reverse travel of carriage. The exception, however, is that motor 134, rectifier 366 and clutch 155 will be used.

What is claimed is:

1. In combination with a test fixture, a metallic block forming the outer conductor of a coaxial line, an electrical measuring assembly, mounted on said block, and means for causing said measuring assembly to traverse said block at a selected one of a plurality of speeds, said means comprising a plurality of reversible synchronous motors, means drivably connecting said motors to said measuring assembly, said motors having different speed characteristics, a single source of alternating current for said motors, and switch means for connecting said source to a selected one of said motors, to supply energizing current thereto.

2. The combination defined in claim 1, wherein said drive-connecting means includes magnetic clutch means, and clutch energizing means including said current source and said switch means.

3. The combination defined in claim 1, including adjustable motor-deenergizing switch assemblies, distinct from said first-named switch means, for controlling the distance traversed by said measuring assembly on successive strokes.

4. The combination defined in claim 2, wherein said clutch energizing means includes means for rectifying the alternating current supplied by said A.C. source, and means for applying the resulting D.C. voltage to said magnetic clutch means.

References Cited in the file of this patent

UNITED STATES PATENTS

| | | |
|---|---|---|
| 906,659 | Richards | Dec. 15, 1908 |
| 2,280,652 | Lamond | Apr. 21, 1942 |
| 2,573,011 | Gruber | Oct. 30, 1951 |
| 2,748,345 | Phillips | May 29, 1956 |